(12) United States Patent
Shu et al.

(10) Patent No.: US 8,820,186 B2
(45) Date of Patent: Sep. 2, 2014

(54) TRANSMISSION CAPABLE OF MULTI-SPEED GEAR-SHIFTING BY REVERSE MOTION

(75) Inventors: Hsin Yang Shu, Guanyin Township (TW); Chen Hsiu Lee, Luzhu Township (TW)

(73) Assignee: Sun Race Sturmey-Archer, Inc., Hai-Hu Village, Lu-Ju (TW)

( * ) Notice: Subject to any disclaimer, the term of this patent is extended or adjusted under 35 U.S.C. 154(b) by 149 days.

(21) Appl. No.: 13/489,533

(22) Filed: Jun. 6, 2012

(65) Prior Publication Data

US 2013/0327171 A1    Dec. 12, 2013

(51) Int. Cl.
*F16H 59/00* (2006.01)

(52) U.S. Cl.
USPC ........................................................ 74/337.5

(58) Field of Classification Search
USPC ......................................... 74/337.5, 431, 567
See application file for complete search history.

(56) References Cited

U.S. PATENT DOCUMENTS

| 3,922,005 | A | * | 11/1975 | Bundschuh | 280/237 |
| 4,856,357 | A | * | 8/1989 | David | 74/63 |
| 7,040,440 | B2 | * | 5/2006 | Kurita et al. | 180/206.5 |
| 7,166,056 | B2 | * | 1/2007 | Miller et al. | 476/37 |
| 7,651,437 | B2 | * | 1/2010 | Miller et al. | 476/38 |

* cited by examiner

*Primary Examiner* — Ha D Ho
(74) *Attorney, Agent, or Firm* — Barlow, Josephs & Holmes, Ltd.

(57) ABSTRACT

A transmission particularly for bicycles, which is capable of multi-speed gear-shifting by means of reverse rotation and comprises: a transmission axle rotatable in both positive and reverse directions, a speed-changing gear set, a speed-changing cam set, and a transmission seat. The speed-changing gear set comprises a plurality of transmission gears and speed-changing gears which are respectively engaging with the transmission gears. When the transmission axle rotates reversely, the speed-changing cam set can be driven in order to control and decide which transmission gear of the speed-changing gear set is to be engaged and driven by the transmission axle during positive rotation, so as to achieve the feature of multi-speed gear-shifting by means of reverse rotation.

11 Claims, 12 Drawing Sheets

A-A SECTION

TRANSMISSION CAPABLE OF MULTI-SPEED GEAR-SHIFTING BY REVERSE MOTION

FIELD OF THE INVENTION

The present invention relates to a transmission capable of multi-speed gear-shifting by reverse rotation. The invention is more particularly, but not exclusively, related to a transmission capable of multi-speed gear shifting by reverse rotation that is suitable for installation on bicycles and could achieve multi-speed gear shift by driving the reverse rotation of a pedal crank.

BACKGROUND OF THE INVENTION

With rising public awareness to environmental protection, healthy living, physical fitness and depletion of natural resources, more and more people opt for the pollution-free, less resource-consuming while good-for-your-health bicycle as a preferred mode of transportation and exercise to replace the energy-consuming and air polluting motorcycles and cars.

Multi-speed bicycles currently available on the market mostly achieve speed change by using a shift lever to control movement of derailleur mechanism that guides the chain to engage one of a number of chain wheels of different sizes. It is also known to use a transmission installed in bicycle hub that enables a shift between high and low gears by driving the reverse rotation of chain wheels. The known transmission mechanisms typically achieve only two-speed gear shift or have the drawbacks of complicated mechanism, high-cost or slow response to gear change so that further improvement is warranted.

SUMMARY OF THE INVENTION

The primary object of the invention is to provide a transmission capable of multi-speed gear-shifting by reverse rotation that allows at least three-speed gear shift by driving the reverse rotation of a crank and offers the advantages of simple mechanism, low cost and quick and smooth response to gear change.

To achieve the aforesaid object, a transmission capable of multi-speed gear-shifting by reverse rotation in a first aspect of the invention comprises:

a transmission axle drivable by a power input to rotate in both positive and reverse directions;

a gear set comprising a plurality of transmission gears rotatably mounted on the transmission axle and a corresponding plurality of speed-changing gears mounted for rotation about an axis parallel to but spaced from the transmission axle, each of the speed changing gears engaging a respective one of the transmission gears, the speed changing gears being drivingly interconnected so as to rotate synchronously with one another;

a gear-shift mechanism comprising a cam set mounted on the transmission axle and at least one gear-shift control component movably mounted to the transmission axle and operative under control of the cam set to selectively couple one of the transmission gears to the transmission axle so that drive can be transmitted to the coupled transmission gear when the transmission axle is rotated in a forward direction; and a power output component drivingly coupled with one of the transmission gears;

the cam set comprising first and second fixed axle plates non-rotatably mounted to the transmission axle for synchronous rotation with the transmission axle and a gear-shift control cam rotatably mounted to the transmission axle between the first and second fixed axle plates, the gear-shift control cam having an outer circumferential surface about which are disposed a plurality of abutment blocks;

the gear shift mechanism also comprising at least one gear-shift control pawl biased into contact with the outer circumferential surface of the gear-shift control cam so as to drivingly engage an abutment block on the gear-shift control cam to prevent the gear-shift control cam from rotating in the reverse direction when the transmission axle is rotated in the reverse direction;

the gear-shift control cam and the at least one gear-shift control component being operatively coupled such that the rotational position of the gear-shift control cam relative to the transmission axle determines which of the transmission gears are drivingly coupled to the transmission axle by the at least one gear-shift control component;

wherein the fixed axle plates each have a corresponding plurality of arcuate slots equi-spaced in a circumferential direction and arranged on a common pitch circle diameter, the arcuate slots each having a leading end and a trailing end when considered in a forward direction of rotation, the slots in each fixed axle plate being circumferentially offset from those in the other fixed axle plate and arranged such that there is a circumferential gap between the leading end of each arcuate slot and the trailing end of an adjacent slot in the other plate, the gear-shift control cam having a plurality of abutments equi-spaced circumferentially along a common pitch circle diameter with the arcuate slots, each abutment protruding on both sides of the cam for engagement with the arcuate slots in the fixed axle plates, the abutments being spaced circumferentially by a distance generally equal to the spacing between the leading end of an arcuate slot in one of the fixed axle plates and the leading end of an adjacent arcuate slot in the other of the fixed axle plates such that each abutment can engage with only one of the arcuate slots at any give angular position of the cam relative to the fixed axle plates, the arrangement being such that each abutment is moved out of engagement with one of the arcuate slots in one of the fixed axel plates and into engagement with an adjacent arcuate slot in the other plate as the gear-shift control cam is rotated relative to the transmission axle to effect a change from one gear to another.

In an embodiment, the at least one gear-shift control component comprises a plurality of axle pawls, one axle pawl for each transmission gear, the axle pawls being located in recesses spaced circumferentially about the transmission axle and each having a drive tooth for location within an inner annular surface of its respective transmission gear and a shift tooth for location within an inner annular surface of the gear-shift control cam, the drive tooth and the shift tooth of each axle pawl being interconnected for synchronous movement between raised and refracted positions, each axle pawl being biased to a position in which its drive and shift teeth are raised;

the inner annular surface of the gear-shift control cam comprises a plurality of spaced concavities, each of which can accommodate a shift tooth of an axle pawl in the raised position when fully aligned with the shift tooth, the axle pawls and the concavities being arranged so that when the shift tooth of one of the axle pawls is accommodated in a fully raised position in one of the concavities, the shift teeth of the other axle pawls are all held in their retracted position;

the inner annular surface of each transmission gear defining at least one abutment surface which can be engaged by the drive tooth of its respective axle pawl when the drive tooth is in a raised position, the drive tooth and abutment surface being configured such that drive can only be transferred from the transmission axle to the transmission gear through the raised drive tooth when the transmission axle is rotated in the positive direction.

The abutments and arcuate slots may be configured so that each abutment enters the gap between adjacent arcuate slots in the two fixed axel plates when the gear-shift control cam is moved to an angular position relative to the transmission axel at which two of the axle pawls are being toggled between raised and retracted positions. The arcuate slots may all be the same length.

In an embodiment there are three transmission gears, three speed changing gears and three axle pawls. The gear-shift control cam may have six abutment blocks on its outer circumferential surface and two concavities on its inner annular surface. There may be three arcuate slots in each of the fixed axle plates and six abutments on the gear-shift control cam for engagement with the arcuate slots.

The abutments on the gear-shift control cam may comprise steel balls, each located in an orifice in the cam plate so as to protrude from the plate on both sides.

The fixed axle plates may be resilient so as to squeeze the abutments between themselves.

The transmission axel may have drive formations at either end to which cranks can be fitted to drive the transmission axle for positive or reverse rotation.

The transmission may be assembled to a bicycle.

An embodiment of the invention will now be described, by way of example only, with reference to the accompanying drawings.

DETAILED DESCRIPTION OF THE INVENTION

Figure 1:
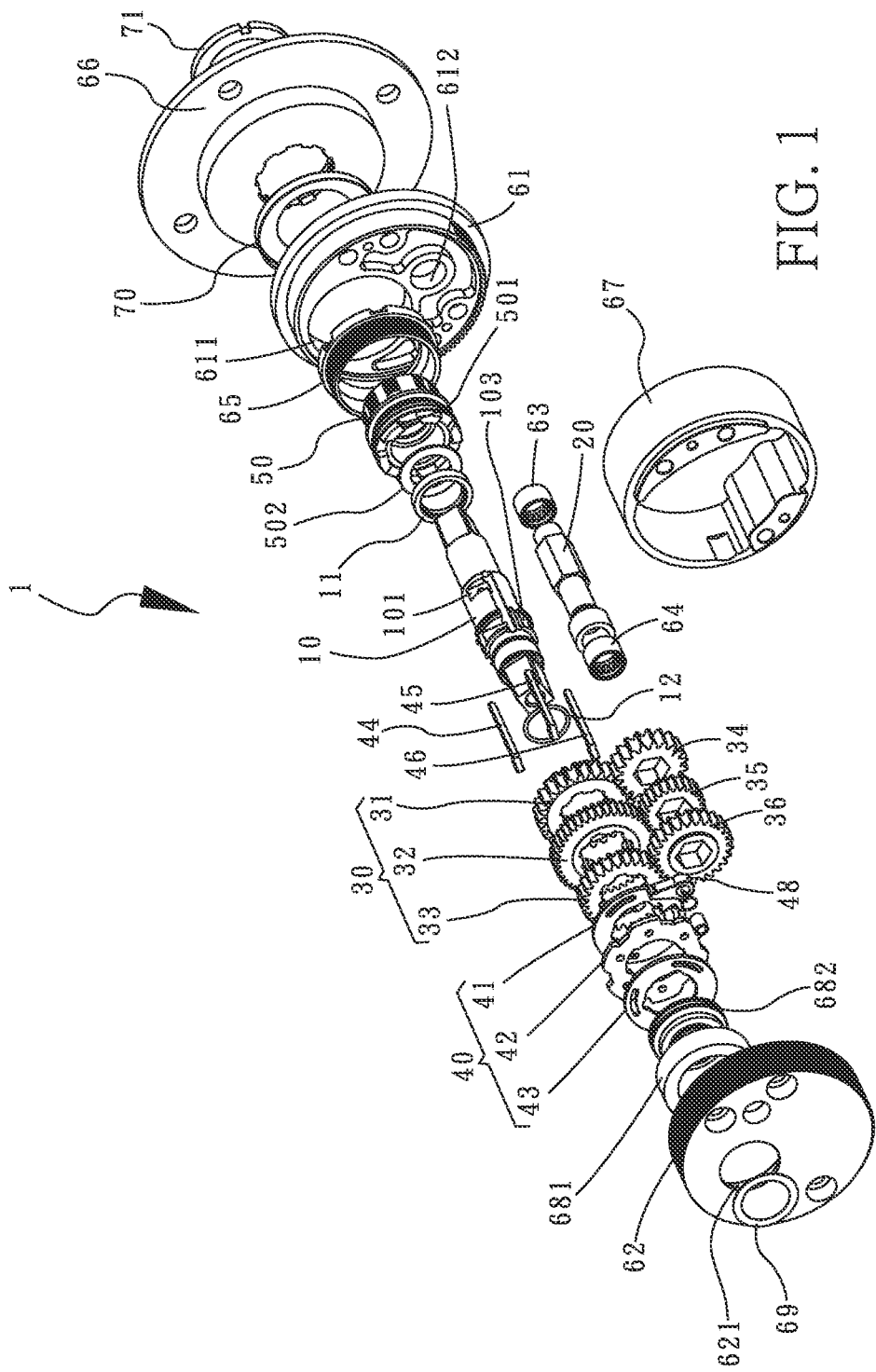
FIG. 1 is an exploded view of a transmission capable of multi-speed gear-shifting by reverse rotation according to an embodiment of the invention from a first perspective.

The Figures illustrate a transmission 1 capable of multi-speed gear-shifting by reverse rotation according to an embodiment of the invention. The transmission 1 can be installed in the frame of a bicycle (not shown in the figures), more particularly at the location of the frame's bottom bracket where the bicycle crank axle assembly is usually located. The transmission 1 can be used to achieve at least three-speed gear shift by reverse rotation of the pedal crank 91 (i.e. reverse pedaling). In this embodiment, the transmission 1 comprises: a transmission axle 10, a speed-changing axle 20, a speed-changing gear set 30, a speed-changing cam set 40, a transmission seat 50, a first fixed seat 61, a second fixed seat 62, two needle bearings 63, 64, a ball collar 65, a sprocket seat 66, a support tube 67, a cup 681 and a cone 682.

The transmission axle 10 is coupled to a power input and is drivable by said power input to rotate both in positive (forward) and reverse directions. In this embodiment, the power input comprises the two pedal cranks 91 of the bicycle. The term "forward direction" here refers to the direction of rotation that the pedal cranks and the transmission axel are moved in when a bicycle to which the transmission is fitted is moved in a forward direction. The external surface of the transmission axle 10 is arranged with a plurality of axially extended pawl receptacles or recesses 101, 102, 103, and a square head drive member is configured at each end of the transmission axle 10 for driving connecting with a crank 91. In this embodiment, the plurality of pawl receptacles consist of a first pawl receptacle 101, a second pawl receptacle 102, and a third pawl receptacle 103. Respective pawl receptacles 101, 102, 103 have an axially extended long, narrow and shallow trench structure, and are spaced approximately at equal distances apart circumferentially about the axle.

The speed-changing axle 20 is parallel to and arranged at a predetermined distance apart from the transmission axle 10. The speed-changing gear set 30 consists of a plurality of transmission gears 31, 32, 33 and a plurality of speed-changing gears 34, 35, 36. The plurality of transmission gears 31, 32, 33 are sleeved onto the transmission axle 10 and the plurality of speed-changing gears 34, 35, 36 are sleeved onto the speed-changing axle 20 and correspondingly engage the plurality of transmission gears 31, 32, 33.

Figure 2:
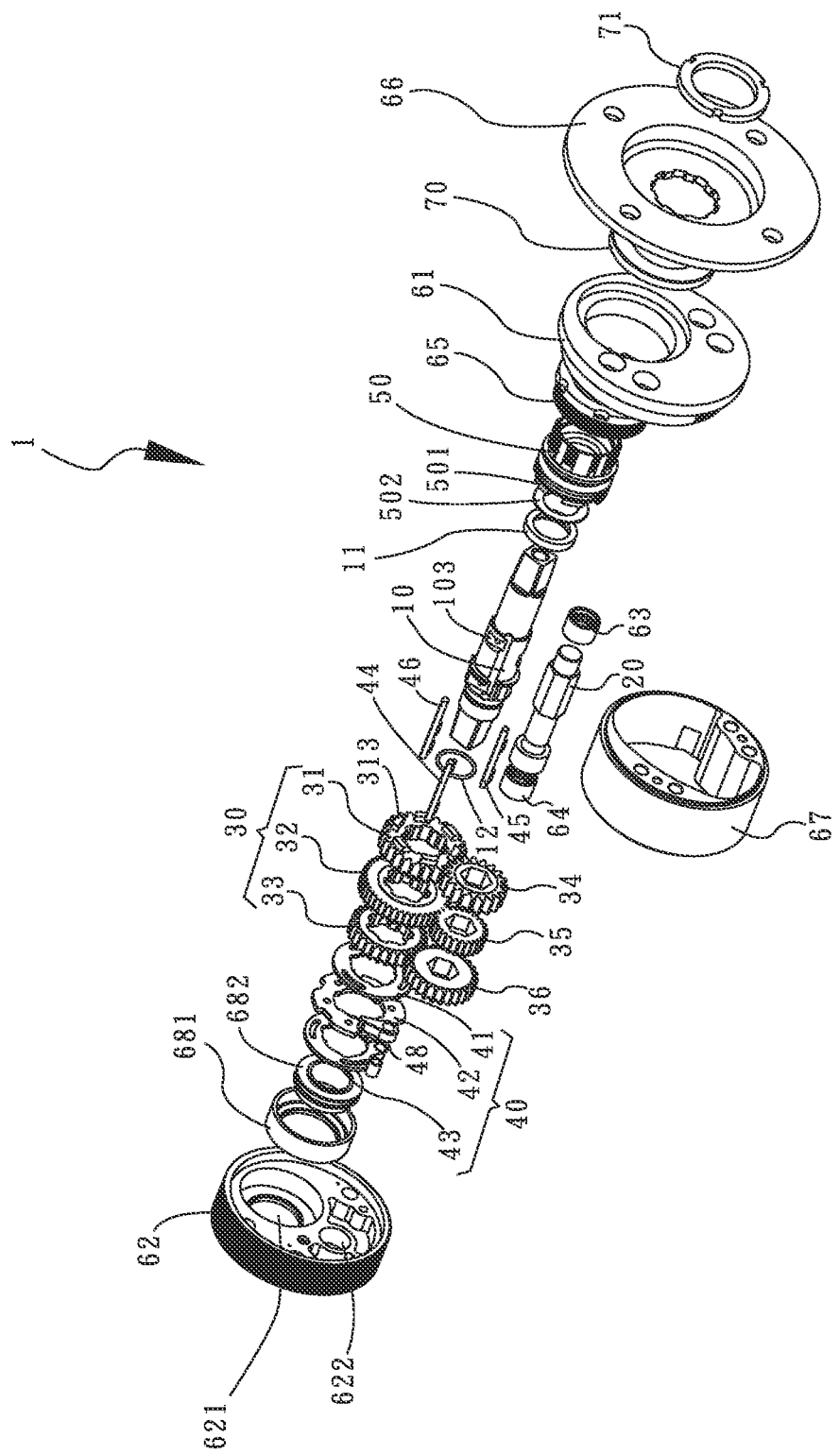
FIG. 2 is an exploded view of the transmission of FIG. 1 from a second perspective.
Figure 3:
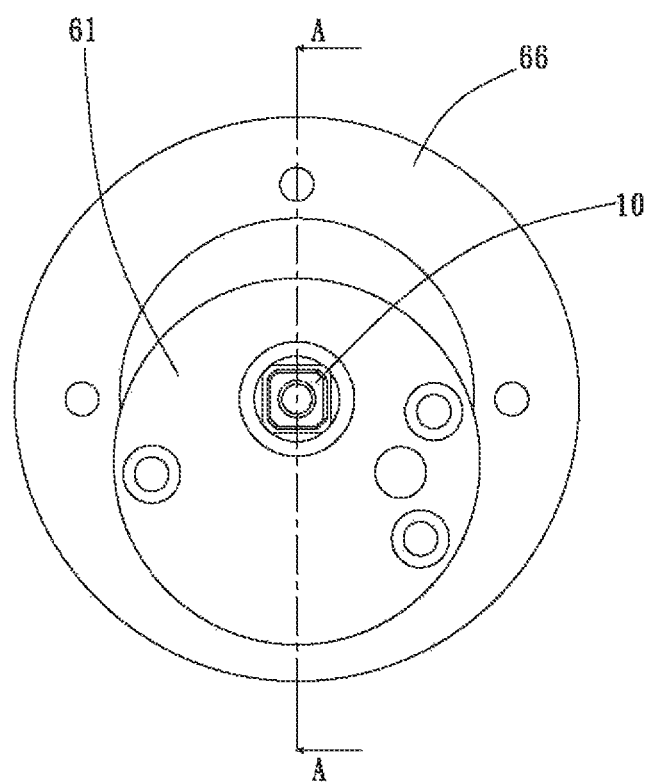
FIG. 3 is a side view taken from the right of the transmission of FIG. 1.
Figure 4:
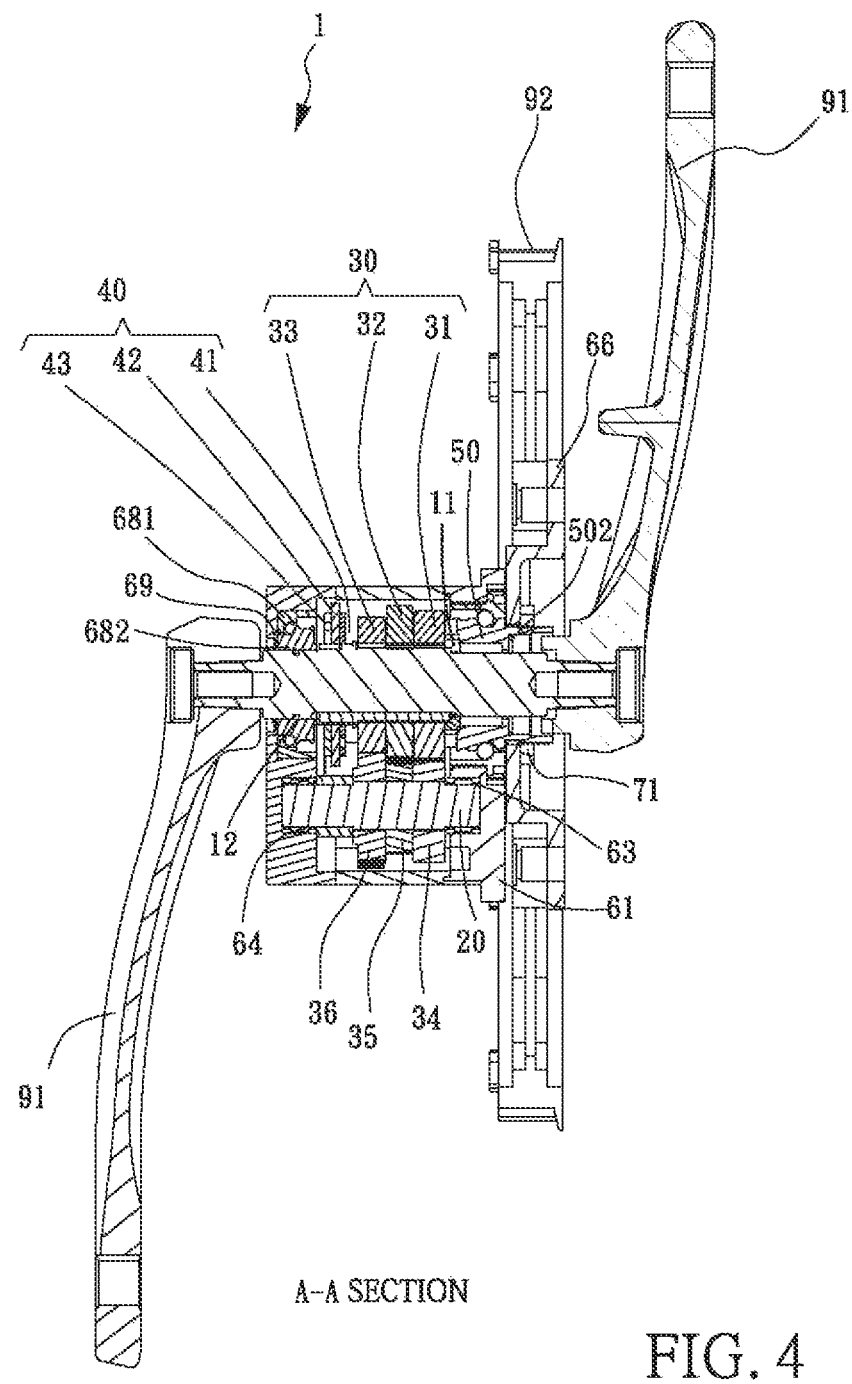
FIG. 4 is an sectional view taken on line A-A of FIG. 3 (including crank and sprocket)
Figure 5:
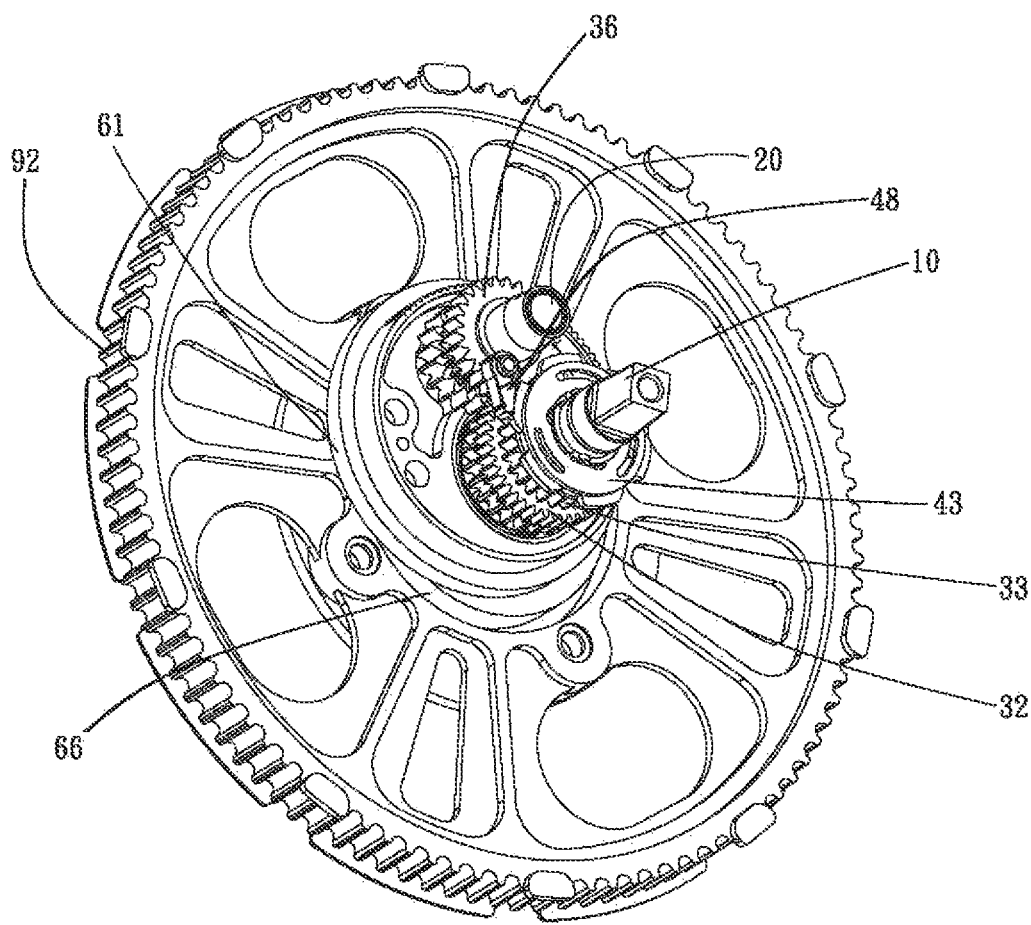
FIG. 5 is a perspective view of part of the transmission of FIGS. 1 to 4 shown in an assembled condition (not including cup, cone and second fixed seat)
Figure 6A:
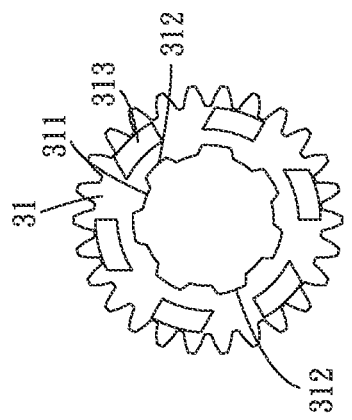
FIGS. 6A, 6B and 6C are side views respectively of a first, a second, and a third transmission gear forming part of the transmission of FIGS. 1 to 5.
Figure 6B:
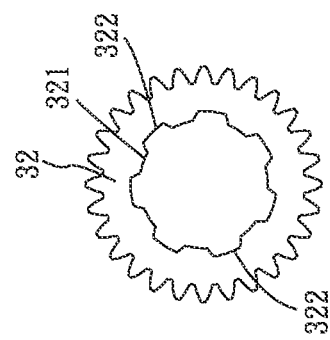
Figure 6C:
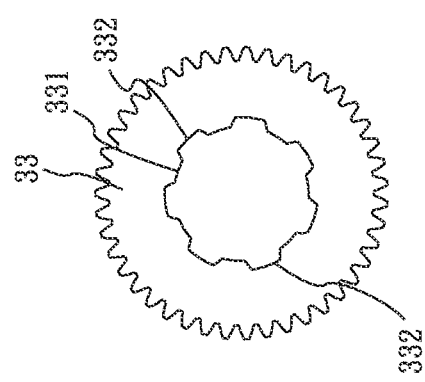

Referring to FIGS. 1, 2 and 4 coupled with FIGS. 6A, 6B and 6C, in this embodiment, the plurality of transmission gears consist of a first transmission gear 31, a second transmission gear 32, and a third transmission gear 33. The first, second and third transmission gears 31, 32, 33 are not rotationally coupled together but may rotate asynchronously about the transmission axle 10. The first transmission gear 31 is drivingly coupled with the socket 501 of a transmission seat 50 via several drive lugs 313. As such, the transmission seat 50 is directly driven by the first transmission gear 31 and rotates synchronously with it. In addition, a plurality of unidirectionally disengageable abutment recesses 312, 322, 332 are respectively disposed on an inner annular surface 311, 321, 331 of each transmission gear 31, 32, 33. The plurality of abutment recesses 312, 322, 332 of each of the transmission gears 31, 32, 33 are engaged or butted by a drive tooth 441, 451, 461 on a corresponding one of the axle pawls when the respective drive tooth 441, 451, 461 is in a raised or lift position and the transmission axle 10 rotates in the positive direction to transmit drive from the transmission axle 10 to the respective transmission gear. The abutment recesses 312, 322, 332 are shaped so that when the transmission axle 10 rotates in the reverse direction, any drive tooth 441, 451, 461 that is in a raised position disengages or rides over the abutment recesses and drive is not transmitted to the respective transmission gear. The plurality of speed-changing gears consists of a first speed-changing gear 34, a second speed-changing gear 35, and a third speed-changing gear 36, which engage respectively with the first transmission gear 31, the second transmission gear 32 and the third transmission gear 33. In this embodiment, the first, second and third speed-changing gears 34, 35, 36 rotate synchronously with speed-changing axle 20. Alternatively, the speed-changing gears 34, 35, 36 could be rotationally coupled together to rotate synchronously about the speed-changing axle. At least two out of the first, second and third transmission gears 31, 32, 33 have different numbers of teeth, and at least two out of the first, second and third speed-changing gears 34, 35, 36 have different numbers of teeth. In this embodiment, the second transmission gear 32 has more teeth than the first transmission gear 31, while the first transmission gear 31 has more teeth than the third transmission gear 33. In addition, the third speed-changing gear 36 has more teeth than the first speed-changing gear 34, while the first speed-changing gear 34 has more teeth than the second speed-changing gear 35.

Referring to FIGS. 1~5 and FIGS. 7A, 7B, & 7C, the speed-changing cam set 40 consists of a first fixed axle plate 41, a gear-shift cam 42, a second fixed axle plate 43, a plurality of axle pawls 44, 45, 46 and at least one gear-shift control pawl 48. The first and second fixed axle plates 41, 43 and the gear-shift control cam 42 are sleeved onto the transmission axle 10. The plurality of axle pawls 44, 45, 46 are each respectively accommodated in one of the plurality of pawl receptacles 101, 102, 103 on the transmission axle 10 for synchronous rotation with the transmission axle 10. A retainer ring 11 locates about the transmission axle 10 to assist in holding the axle pawls 44, 45, 46 in position within the pawl receptacles 101, 102, 103. The axle pawls 44, 45, 46 are able to be individually switched between a retracted position and a lift position under the control of the gear-shift cam 42. Thus the plurality of axle pawls 44, 45, 46 can also be referred to as "axle control components", meaning control components configured on the axle. The gear-shift control pawl 48 is located adjacent to and abutting an outer circumferential edge of the gear-shift control cam 42 and is operative to control the gear-shift control cam 42 and hence movement of the plurality of axle pawls 44, 45, 46 between their retracted and lifted positions to select the various gears.

The plurality of axle pawls 44, 45, 46 each have a drive tooth 441, 451, 461 spaced from a shift tooth 442, 452, 462 located at one end of the pawl. The spacing between shift tooth 442, 452, 462 and the drive tooth 441, 451, 461 is different on each of the axle pawls 44, 45, 46 so that the drive tooth 441, 451, 461 of each axle pawl 44, 45, 46 locates within the inner annular surface 311, 321, 331 of a respective one of the plurality of transmission gears 31, 32, 33. When an axle pawl 44 (or 45, or 46) is in the lift position, the drive tooth 441 (or 451, or 461) of the lifted axle pawl 44 (or 45, or 46) is butted against the abutment recess 312 (or 322, or 332) in the inner annular surface 311 (or 321, or 331) of the corresponding transmission gear 31 (or 32, or 33) and transmits drive to the corresponding transmission gear when the transmission axle 10 rotates in the positive direction, whereas the transmission gears corresponding to other axle pawls that are in a retracted position will not be driven directly by the positive rotation of transmission axle 10. Whichever transmission gear 31, 32, 33 is drivingly coupled to the transmission axle through a raised one of the axle pawls, the rotational force when the transmission axle 10 is driven to rotate in a positive direction is transmitted to the transmission seat 50 through the first transmission gear 31.

For example, when the first axle pawl 44 is in the lift position, the other two axle pawls 45, 46 will be in a retracted position. At this time, transmission axle 10 would drive the first transmission gear 31 directly during positive rotation and transmit the rotational force to the sprocket seat 66 through the transmission seat 50. At the same time, the other two transmission gears 32, 33 are in non-transmission state. On the other hand, when the second axle pawl 45 is in the lift position, the other two axle pawls 44, 46 will be in a retracted position. At this time, positive rotation of transmission axle 10 will drive the second transmission gear 32 directly, which then transmits the force to the second speed-changing gear 35 it engages. The force is then transmitted to the first speed-changing gear 34 that rotates synchronously with the second speed-changing gear 35 through the speed-changing axle 20, and then to the first transmission gear 31 engaged by the first speed-changing gear 34. Furthermore, the rotational force is transmitted to sprocket seat 66 through transmission seat 50. At the same time, the third transmission gear 33 is in non-transmission state. When the third axle pawl 46 is in the lift position, the other two axle pawls 44, 45 will be in a retracted position. At this time, positive rotation of transmission axle 10 will drive the third transmission gear 33 directly, which then transmits drive to the third speed-changing gear 36 it engages. The force is then transmitted to the first speed-changing gear 34 that rotates synchronously with the third speed-changing gear 36 through the speed-changing axle 20 and then to the first transmission gear 31 that engages the first speed-changing gear 34, and furthermore to the sprocket seat 66 through the transmission seat 50. At the same time, the second transmission gear 32 is in non-transmission state. As described in more detail below, the reverse rotation of transmission axle 10 controls sequentially which axle pawl 44, 45, 46 is switched to the lift position, thereby changing the overall ratio of the transmission 1 and hence the rotational speed of the output power for a given input speed and achieving three speed gear shifting.

Figure 7A:
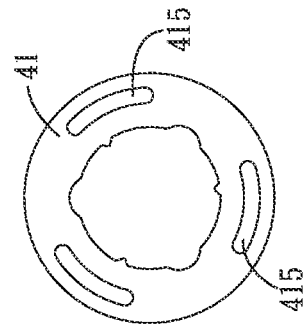
FIGS. 7A, 7B and 7C are side views respectively of a first fixed axle plate, a gear-shift control cam and a second fixed axle plate forming part of the transmission of FIGS. 1 to 5.
Figure 7B:
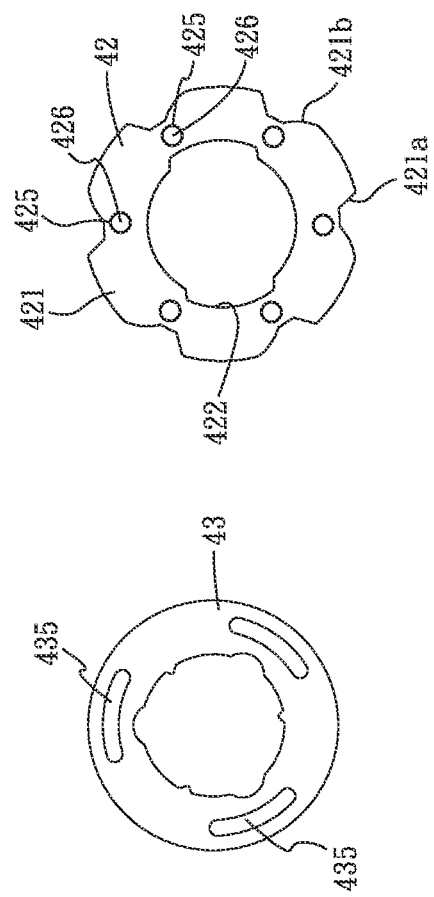
Figure 7C:
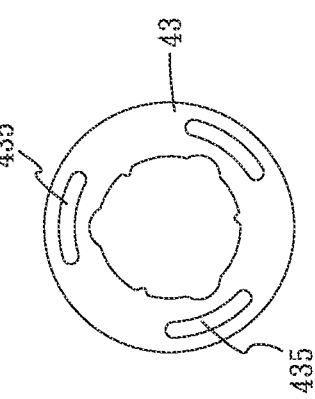
Figure 8A:
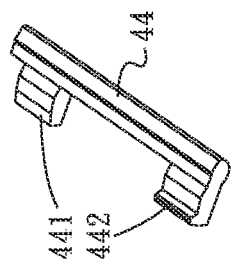
FIGS. 8A, 8B and 8C are perspective views respectively of a first, a second and a third axle pawl forming part of the transmission of FIGS. 1 to 5.
Figure 8B:
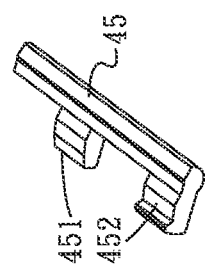
Figure 8C:
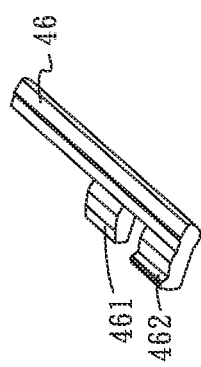
Figure 9:
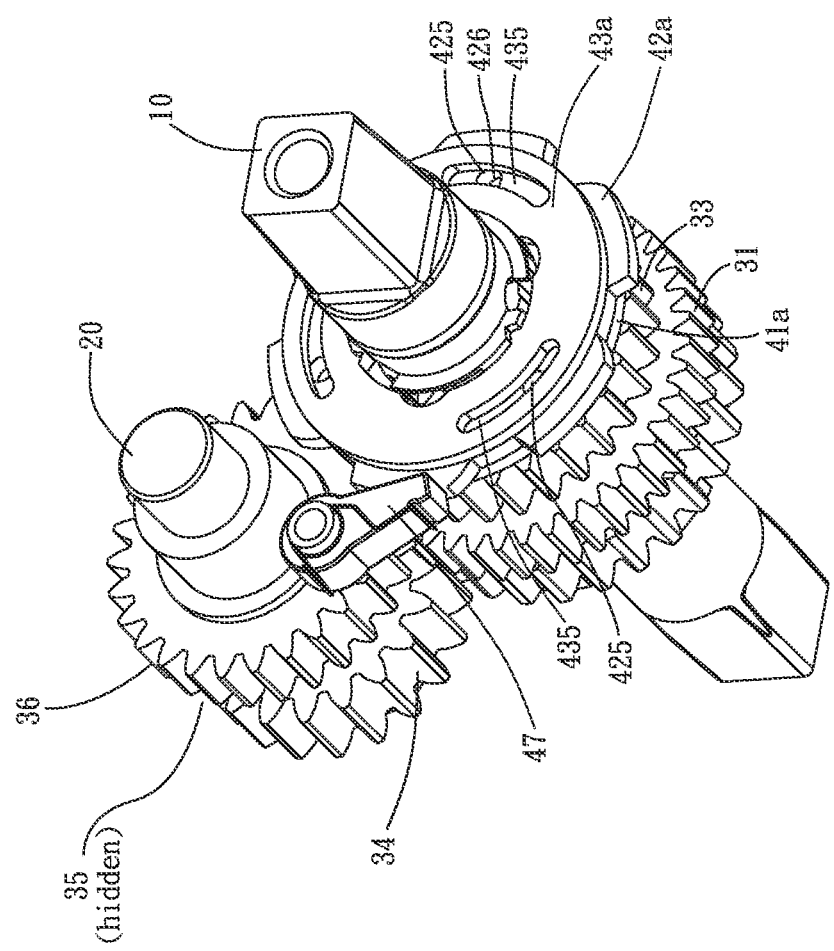
FIG. 9 is a perspective view of part of the transmission of FIGS. 1 to 5.
Figure 11A:
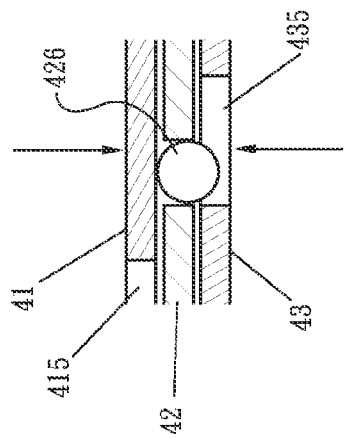
FIGS. 11A to 11C are a series of cross-sectional views through the gear shift cam set arrangement of the transmission of FIGS. 1 to 5 at different phases in a gear change operation; and, FIGS. 12A and 12B are detailed views of a cam set forming part of the transmission of FIGS. 1 to 5, illustrating operation of a mechanism for prevent idling between gear changes.

The speed-changing cam set 40 will now be described in more detail with reference FIGS. 1 and 2 coupled with FIGS. 7A, 7B and 7C. The first and the second fixed axle plates 41, 43 are rotationally secured on the transmission axle 10 and rotate synchronously with it. The gear-shift control cam 42 is rotatably sleeved onto the transmission axle 10 and interposed between the first and the second fixed axle plates 41, 43. The fixed axle plates 41, 43 and the gear-shift control cam 42 are all annular. The outer annular surface of the gear-shift control cam 42 is disposed with a plurality of abutment blocks 421, and the inner annular surface of the gear-shift control cam 42 is disposed with a plurality of concavities 422. In this embodiment, the plurality of abutment blocks 421 on the gear-shift control cam 42 are six in number, while the plurality of concavities 422 on the gear-shift control cam 42 are two in number.

The drive tooth 441 (or 451, or 461) and the shift tooth 442 (or 452, or 462) of each respective axle pawl 44 (or 45, or 46) are rigidly interconnected and will synchronously move between a retracted position or lift position. The drive tooth 441 of the first axle pawl 44 locates within the inner annular surface 311 of the first transmission gear 31; the drive tooth 451 of the second axle pawl 45 locates within the inner annular surface 321 of the second transmission gear 32; and the drive tooth 461 of the third axle pawl 46 locates within the inner annular surface 331 of the third transmission gear 33. In addition, the shift tooth 442, 452, 462 of each axle pawl 44, 45, 46 locates within the inner annular surface of the gear-shift control cam 42. When a concavity 422 on the inner annular surface of the gear-shift control cam 42 aligns exactly to the shift tooth 442 (or 452, or 462) of an axle pawl 44 (or 45, or 46), the shift tooth 442 (or 452, or 462) of the corresponding axle pawl 44 (or 45, or 46) moves to the lift position and engages in the concavity 422. Furthermore, the drive tooth 441 (or 451, or 461) of the axle pawl 44 (or 45, or 46) will move simultaneously to the lift position. In contrast, when the shift tooth 442 (or 452, or 462) of an axle pawl 44 (or 45, or 46) does not align to any concavity 422, the axle pawl 44 (or 45, or 46) is held in the retracted position. The first, second and third axle pawls 44, 45, 46 are each disposed with a resilient or elastic element (e.g. a torsion spring) that biases them towards the lift position without the influence of external force.

In the present embodiment, there is a single gear-shift control pawl 48 which is biased into contact with the outer circumferential edge of the gear-shift cam 42 for engagement with the abutment blocks 421. The abutment blocks 421 are profiled to have a relatively steep abutment surface 412a at one circumferential end and a relatively shallow cam surface 421b at the other circumferential end. The abutment surface is located at a trailing end of the abutment blocks 421 and the cam surface 421b at the leading end, as considered when the cam 42 is rotated in a positive or forward direction of the transmission axle 10. The gear-shift control pawl 48 is configured to contact the engagement blocks such that when the gear-shift cam 42 is rotated in a forward direction by the transmission axle 10, the gear-shift control pawl 48 rides over the abutment blocks 421, being lifted by the cam surfaces 421b of each abutment block in turn. However, when the gear-shift cam 42 is driven to rotate in a rearward direction as a result of reverse rotation of the transmission axle 10, the pawl 48 engages the abutment surface 421a of one of the abutment blocks 421 to prevent the gear-shift control cam 42 from rotating further in the reverse direction. Continued reverse rotation of the transmission axle 10 will then result in relative rotational movement between the gear-shift cam 42 and the transmission axle 10. This repositions the concavities 422 in the inner annular surface of the gear-shift control cam 42 relative to the shift teeth 442, 452, 462 of the axle pawls to effect a gear change, as will be described in more detail below.

The gear-shift control pawl 48 is disposed with an elastic element (e.g. a torsion spring) that biases it into contact with the outer circumferential surface of the gear-shift control cam 42. The gear-shift control pawl 48 may be pivotally mounted about a tubular bush or axle mounted to and projecting from the second fixed seat 62. A spacer (not shown) may be provided about the bush between the pawl 48 and the inside surface of the second fixed seat 62 to position the pawl 48 in correct alignment with the gear-shift control cam 42. The torsion spring may be operative between the pawl 48 and the bush/axle. Whilst the present embodiment has only one gear-shift control pawl 48, more than one gear-shift control pawl 48 can be provided. Where more than one gear-shift control pawl 48 is provided, the pawls 48 are spaced circumferentially about the gear-shift control cam 42 such that when the transmission axle 10 is rotated in the reverse direction, only one gear-shift control pawl 48 engages with an abutment surface 421a of one of the abutment blocks 421. Which of the pawls 48 first drivingly engages with an abutment block 421 will depend on the angular position of the transmission axle 10 and the gear-shift control cam 42 when the user begins to pedal backwards. The number and position of the gear-shift control pawls 48 and the number and position of the abutment blocks 421 on the gear-shift control cam 42 determines the angle by which the user must reverse pedal before one of the gear-shift control pawls 48 engages with the abutment surface 421a of one of the abutment blocks 421 to commence a change gear operation. It will be appreciated that the number and position of the gear-shift control pawls 48 and the number and position of the abutment blocks 421 on the gear-shift control cam 42 can be selected so as to ensure that the angle by which the user must pedal backwards to start a gear change is not too large to be acceptable to the user whilst at the same time keeping the number of components to an acceptable level.

As discussed above, only when the transmission axle 10 rotates in reverse direction will a gear-shift control pawl 48 come into driving engagement against the abutment surface 421a of an abutment block 421 of the gear-shift control cam 42. In addition, only when a gear-shift control pawl 48 is butted against an abutment block 421 of the gear-shift control cam 42 and the transmission axle 10 continues to rotate in the reverse direction for a predetermined angle will the gear-shift control pawl 48 drive the gear-shift control cam 42 to turn relative to the transmission axle 10, which causes the concavities 422 on the inner annular surface of the gear-shift control cam 42 to move relative to the positions of the shift teeth 442, 452, 462 of the axle pawls 44, 45, 46 thereby achieving the objective of gear shift and speed changing. In addition, the unidirectional disengagement of the plurality of abutment recesses 312, 322, 332 disposed on the inner annular surface 311, 321, 331 of respective transmission gears 31, 32, 33 will cause the first, second and third axle pawls 44, 45, 46, regardless whether they are in lift position or retracted position, to disengage from the abutment recesses 312, 322, 332 of respective transmission gears 31, 32, 33 when the transmission axle 10 rotates in reverse direction. Only when the transmission axle 10 rotates in positive direction will the drive tooth 441 (or 451, or 461) of an axle pawl 44 (or 45, or 46) in a lift position be drivingly engaged against the abutment recess 312 (or 322, or 332) of the corresponding transmission gear 31 (or 32, or 33). In other words, when the transmission axle 10 rotates in reverse direction, it can only engage in gear shift and speed change operations and only when the transmission axle 10 rotates in the positive direction will the input power from the transmission axle 10 be outputted through the transmission seat 50 that is connected to the transmission gear 31. Simply put, the position of the concavities 422 configured on the inner annular surface of the gear-shift control cam 42 as shown in FIG. 7B relative to the rotation angle of the transmission axle 10 determines the lift or retracted state of the drive teeth 441, 451, 461 of the first, second and third axle pawl 44, 45, 46. The position of concavities 422, coupled with the relative position of the plurality of abutment blocks 421 of the gear-shift control cam 42 to the gear-shift control pawls 47, 48 determines the gear shift position of the cranks 91. The arrangement is such that a rider can use either the left or the right hand crank to change gear, depending which is in an appropriate elevated position at the time.

As shown in FIGS. 1~5, the transmission seat 50 is positioned between a power output member and the plurality of transmission gears 31, 32, 33, and is engaged and driven by the first transmission gear 31, thereby outputting the rotational force generated during the positive rotation of the transmission axle 10 to the power output member. In this embodiment, the power output member is the sprocket 92. As described above, the transmission gear 31 (or 32, or 33) driven by the transmission axle 10, possibly coupled with one speed-changing gear 34 (or 35, or 36) among the plurality of speed-changing gears it correspondingly engages, determines the gear ratio and hence the rotational speed of the transmission seat 50. Thus when the transmission gear 31, 32, 33 driven by the positive rotation of transmission axle 10 changes, the gear ratio and hence the rotational speed of the transmission seat 50 for a given rotational speed of the input also changes, thereby achieving the objective of multi-speed change. Accordingly, using the cam set 40 to change which of the axle pawls 44, 45, 46 is in a lifted position by rotating the transmission axle 10 in a reverse direction changes the transmission gear 31, 32, 32 engaged and so changes the overall gear ratio of the transmission.

The first fixed seat 61 and the second fixed seat 62 are respectively situated at or towards each end of the transmission axle 10 and secured to the bicycle frame. The first and the second fixed seats 61, 62 each have a respective opening 611, 621 and a speed-changing axle seat 612, 622 thereon. The speed-changing axle 20 is arranged between the two speed-changing axle seats 612, 622 of the first and the second fixed seats 61, 62, and a needle bearing 63, 64 is provided at each end of the speed-changing axle 20 that corresponds to the speed-changing axle seat 612, 622 of the first and the second fixed seat 61, 62, such that the speed-changing axle 20 will turn relative to the first and the second fixed seats 61, 62. A ball collar 65 is accommodated in the opening 611 of the first fixed seat 61. The transmission seat 50 is sleeved onto the ball collar 65 to enable the transmission seat 50 to turn relative to the first fixed seat 61. One end of the transmission seat 50 protrudes outside the side of the first fixed seat 61 that is farther away from the second fixed seat 62. The sprocket seat 66 is disposed at the side of the first fixed seat 61 farther away from the second fixed seat 62 and attached to and driven by the transmission seat 50, wherein sprocket 92 is mounted on the sprocket seat 66 for rotation therewith. A seal 502 is positioned between the transmission seat 50 and the transmission axle 10 and a dust cap 70 is mounted to the transmission seat 50 where it protrudes outside the side of the first fixed seat 61 that is farther away from the second fixed seat 62. The dust cap has an outer flange that covers the ball collar 65. A lock ring 71 is used to lock the sprocket seat 66 to the transmission seat 50 and also holds the dust cap in position.

A support tube 67 is arranged between the first fixed seat 61 and the second fixed seat 62 to enhance the structural strength. Other arrangements for enhancing the structural strength can be used. For example, rather than a support tube 67, one or more support posts can be provided between the first and second fixed seats. The transmission axle 10 is sleeved onto the transmission seat 50 so as to allow relative rotation between the two. One end of the transmission axle 10 protrudes outside the opening 611 of the first fixed seat 61, while its other end protrudes outside the opening 621 of the second fixed seat 62. In addition, the ends of transmission axle 10 are respectively connected to the two cranks 91. In addition, a cup 681 and a cone 682 are sleeved onto the transmission axle 10 at a spot that corresponds to the opening 621 of the second fixed seat 62. A seal 12 is provided between the transmission axle 10 and the cone 682 and a seal 69 is located between the second fixed seat 62 and the transmission axle 10.

When the speed-changing cam set 40 is operative to actuate the first, second, and third axle pawls 44, 45, 46, there exists the potential for an unstable interval when any of the axle pawls 44, 45, 46 moves from its lift position to its retracted position, during which idling might occur. During a change from one gear to another, two of the axel pawls are toggled, with one being retracted and the other lifted, the third pawl will remain unmoved in the retracted position. Idling can occur in three possible conditions:

1. the two axle pawls which are being toggled to change gear are both retracted (the third pawl is retracted)
2. the two axle pawls which are being toggled to change gear are both partially raised (the third pawl is retracted)
3. one of the axel pawls being toggled is partially raised and the other is retracted (the third pawl is retracted)

To prevent this unstable interval, the cam set 40 is provided with a mechanism to move gear-shift control cam 42 past the idle position during a gear change operation and to provide feedback to the user when a gear is selected. This mechanism will now be described with reference initially to FIGS. 7A, 7B, 7C, which are side views respectively of the first fixed axle plate 41, the gear-shift control cam 42, and the second fixed axle plate 43. The first fixed axle plate 41 and the second fixed axle plate 43 each have three corresponding, equispaced, arcuate slots 415, 435 located on a common pitch circle diameter about the center of rotation of the plates. The arcuate slots 415, 435 in the present embodiment are all of the same dimensions and the slots in the two plates are off-set in a circumferential direction relative to each other so that the slots in one fixed plate are positioned circumferentially between the slots on the other fixed plate. The arcuate slots 415, 435 are dimensioned so that there is a small circumferential gap a between the circumferential ends of any given slot and the circumferential ends of the adjacent slots in the other of the fixed plates positioned circumferentially either side of said given slot. In addition, a plurality of abutment members 426 are disposed on the gear-shift control cam 42 on the same pitch-circle diameter as the arcuate slots 415, 435 and are configured for engagement in the slots 415, 435. The abutment members 426 are spaced apart circumferentially by a distance that is slightly larger than the circumferential length of the arcuate slots so that each abutment member 426 can engage in only one of the arcuate slots 415, 435 at any particular angular position of the gear-shift control cam 42 relative to the first and second fixed axle plates 41, 43. In the present embodiment, the abutment members 426 are provided by means of steel balls 426 received in round orifices 425 in the gear-shift control cam 42. The diameter of the steel balls 426 is comparable to or slightly smaller than the inner diameter of the round orifice 425. The first and second fixed axle plates 41, 43 are made of a resilient material, such as spring steel for example. The diameter of the steel balls 426 and the spacing between the first and second axle plates 41, 43 are selected so that the balls 426 are firmly held in positive engagement in the slots between the plates 41, 43.

When gear-shift control cam 42 rotates relative to the first and the second fixed axle plates 41, 43, the abutment members 426 slide in the arcuate slots 415, 435 until they reach the leading end of the slots 415, 435 (as considered in a positive, forward direction of rotation) and are butted between the first and the second fixed axle plates 41, 43. Moreover when the gear-shift control cam 42 continues to rotate, the abutment members 426 located in one of the slots 415 in the first fixed axle plate 41 will slide out of their respective arcuate slot 415 into an adjacent arcuate slot 435 in the second fixed axle plate 43 and any abutment members 426 located in one of the arcuate slots 435 in the second fixed axle plate 43 will slide out of their respective arcuate slot 435 into an adjacent arcuate slot 415 in the first fixed axle plate 41. As such, the abutment members 426 and the fixed axle plates 41, 43 will squeeze and push each other and in the process aid the axle pawls 44, 45, 46 to lift and retract rapidly such that the gear-shift control cam 42 is unable to stably adopt an angular position at the junction point between lifting and retracting of any axle pawl 44, 45, 46, thereby removing the fuzzy interval and avoiding conflicts among the pawls in the gear shift process such that there will not be idling during gear shift. Furthermore, the movement of the abutment members 426 from one slot 415, 435 into another slot 415, 435 offers a feedback that gives users a sense of whether a gear shift has occurred during back pedaling.

Figure 12A:
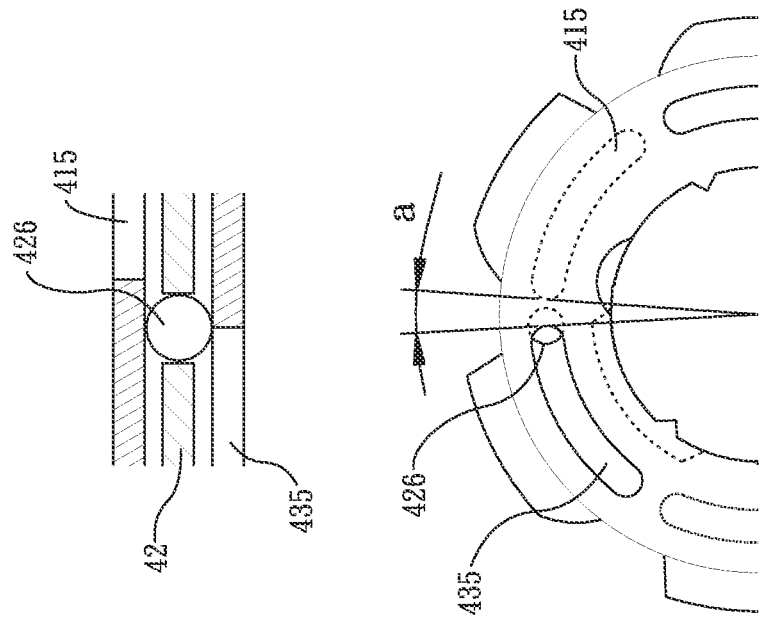
Figure 12B:
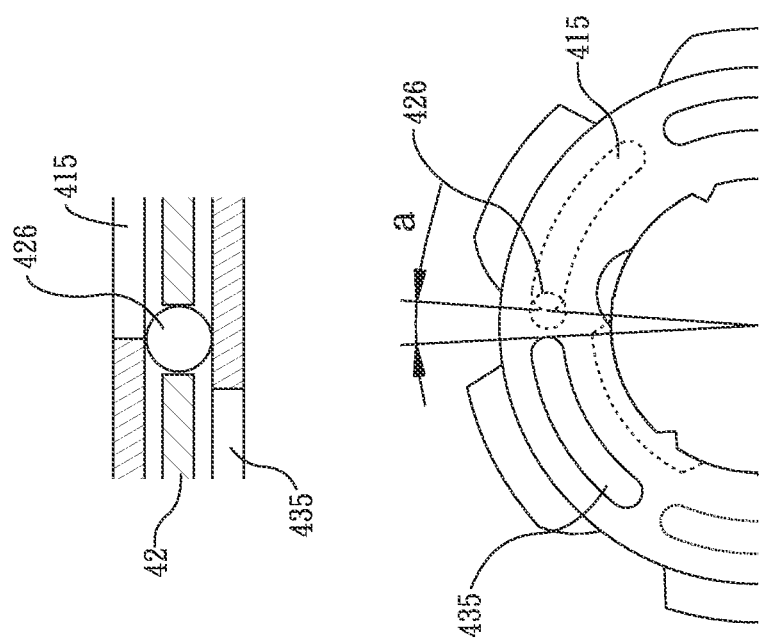

The position of the abutment members 426, the arcuate slots 415, 435 and the plurality of concavities 422 on the inner annular surface of the gear-shift control cam 42 are arranged so that the first, the second and the third axle pawls 44, 45, 46 can be smoothly raised or retracted at the correct angle (that corresponds to the position of the concavities 422) such that none of the first, second and third axle pawls 44, 45, 46 will stay unmoved during the interval of lifting and retraction during a gear change operation. The positioning of the arcuate slots 415, 435, the abutment members 426 and the concavities 422 can be established through trial and error. However, as illustrated in FIG. 12 it has been found in practice that idling can be successfully avoid, when the mechanism is configured so that the abutment members enter the angular zone or gap "a" between adjacent slots at the point at which idling might otherwise occur. This is illustrated in particular in FIGS. 12A and 12B. In practice it has been found that satisfactory operation can be achieved by first determining the position and geometry of the cavities 422 on the inner annular surface of the gear-shift control cam 42; positioning the abutment members 426 in spaced relation about the cam 42 in any suitable positions; and adjusting the length and angular position of the slots 415, 435 so that the steel balls 426 enter the zone "a" at the idle point. The length of the angular zone "a" will vary depending on the specific geometry of any particular transmission but might typically be in the range of 4 degrees to 10 degrees. However, this should not be regarded as limiting on the claimed invention. Typically, the actuate slots 415, 435 will all be of the same length but this is not necessarily the case.

Operation of the cam set 40 will be now be described in detail with reference in particular to FIGS. 10A to 10F and 11A to 11C.

Figure 10C:
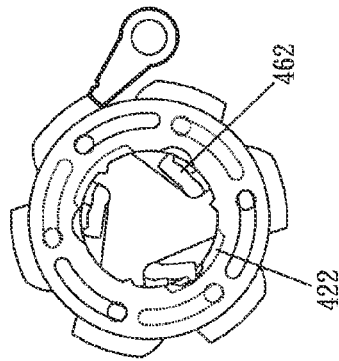
FIGS. 10A to 10F are a series partially cross sectioned views through part of the transmission of FIGS. 1 to 5 illustrating operation a gear shift cam set arrangement.
Figure 10B:
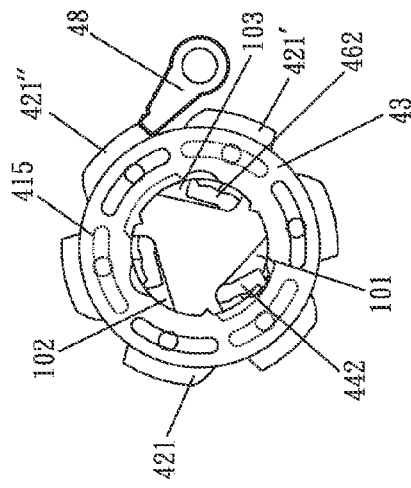
Figure 10A:
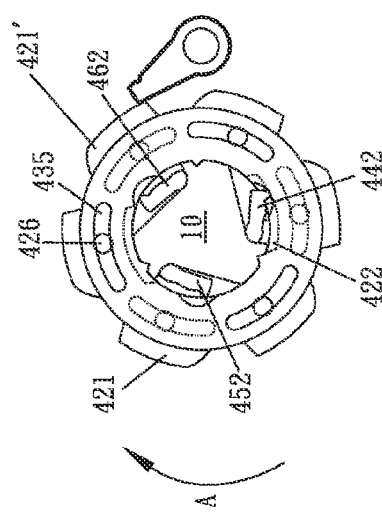

FIG. 10A illustrates the cam set just prior to effecting a gear change from first gear to second gear. The first axle pawl 44 is in the lift position so that the first transmission gear 31 is currently engaged. Accordingly, the switch tooth 442 of the first axle pawl 44 is received in a raised position within one of the concavities 422 in the inner annular surface of the gear-shift control cam 42. The second and third axle pawls 45, 46 are in retracted positions in which their switch teeth are not aligned with any of the concavities 422 in the gear-shift control cam. The abutment members 426 are each located within a respective one of the arcuate slots 415, 435 in the first and second fixed axle plates 41, 43. The arcuate slots 415 in the first axle plate 41 and the abutment members 426 located in those arcuate slots 415 are shown in FIGS. 10A to 10F in hidden detail.

In the angular position of the transmission axle 10 shown in FIG. 10A, the gear-shift control pawl 48 is engaged with an outer circumferential edge of a first one of the abutment blocks 421' on the gear-shift control cam 42. If the rider pedals in a backwards or reverse direction as indicated by arrow A, the cam set 40, including both the fixed axle plates 41, 43 and the gear-shift control cam 42, will rotate together in the reverse direction along with the transmission axle 10 to the position shown in FIG. 10B. During this movement, the gear-shift control pawl 48 moves off the first abutment block 421' on which it was initially engaged and by virtue of the torsion spring biasing it radially inwardly locates between the first abutment block 421' and the next adjacent abutment block 421" so that it can drivingly engage or butt up against the abutment surface 421a of that abutment block 421".

Engagement between the gear shift control pawl 48 and the abutment block 421" on the gear-shift control cam 42 prevents the gear-shift control cam 42 from rotating further in the reverse direction A. Accordingly, if the rider continues to pedal backwards, the transmission axle 10 and the fixed axle plates 41, 43 will rotate in the reverse direction relative to the gear-shift control cam 42. The relative rotational movement between the transmission axle 10 and the gear-shift control cam 42 alters the positions of the cavities 422 in the gear-shift control cam 42 relative to the shift teeth 442, 452, 462 of the axle pawls 44, 45, 46 mounted on the axle. This results in the first axial pawl 44 being gradually depressed into a retracted position to disengage the first transmission gear 31 as the shift tooth 442 on the first axle pawl is gradually moved out of alignment with the concavity 422 in the gear-shift control cam in which it is initially engaged. In addition, the relative rotational movement between the fixed axle plates 41, 43 and the gear-shift control cam 42, causes the abutment members 426 to be moved towards the leading end (as determined in a forward or positive direction of rotation) of the arcuate slots 415, 435 in which they are currently engaged. This is illustrated in FIG. 10C and also in FIG. 11A which shows in cross section one of the spherical abutment members 426 which is currently engaged in an arcuate slot 435 in the second fixed axle plate 43 and located at the leading end of the slot 435.

Figure 10F:
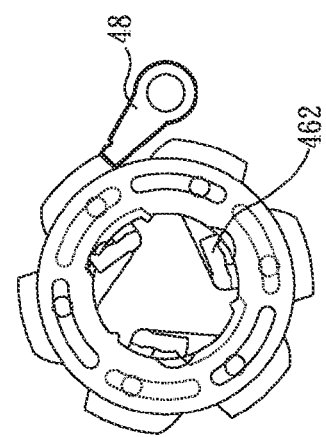
Figure 11C:
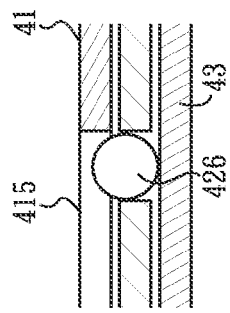
Figure 10E:
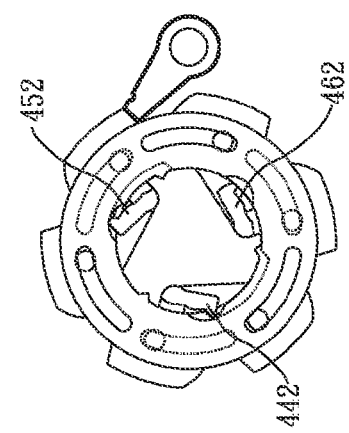
Figure 11B:
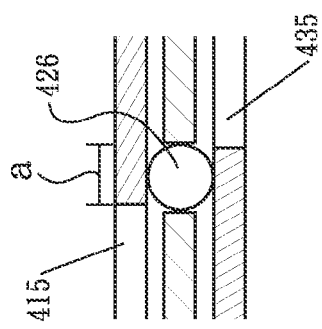
Figure 10D:
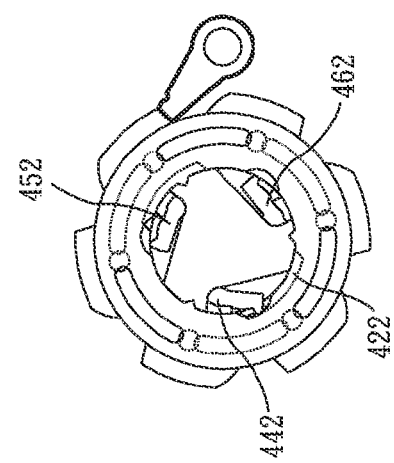

Further continued reverse rotation of the transmission axle 10 and the fixed axle plates 41, 43 relative to the gear-shift control cam 42 causes the first axial pawl 44 to be further depressed and the abutment members 426 to be drawn out of their respective arcuate slots 415, 435 and to be squeezed between the first and second fixed axle plates 41, 43, as illustrated in FIG. 10D and FIG. 11B in the circumferential gap "a" between the leading end of a slot 415, 435 in one of the plates 42, 43 and the trailing end of the next adjacent slot 415, 435 in the other of the plates 42, 43. The abutment members 426 then enter a corresponding adjacent arcuate slot 415, 435 in the other of the fixed axle plates 41, 43 as illustrated in FIG. 10E and FIG. 11C.

As the transmission axle 10 and fixed axle plates 41, 43 continue to rotate in a reverse direction relative to the gear shift control cam 42, the first axle pawl 44 becomes fully depressed as its shift tooth 442 leaves the cavity 422 in the gear-shift control cam in which it was engaged so that the first transmission gear 31 is fully disengaged. At the same time, the shift tooth 452 of the second axle pawl 46 is brought into alignment with another one of the concavities 422 in the gear-shift control cam and is biased to the raised position within the concavity as illustrated in FIG. 10F. Once the second axle pawl 45 is fully raised, as shown in FIG. 10G, the second transmission gear 32 is engaged.

If the transmission axle 10 is now rotated in a forward direction, by the rider pedaling forwardly, drive will be transmitted from the transmission axle 10 to the second transmission gear 32 through the drive tooth 451 of the second axle pawl 45 which is now in a raised position. When the transmission axle 10 is rotated forwardly, the gear-shift control cam 42 will tend to rotate forwardly together with the transmission axle 10. During forward rotation of the cam 42, the gear-shift control pawl 48 does not drivingly engage any of the abutment blocks 421 on the gear-shift control cam 42 to prevent its rotation as it rides up the shallow cam surfaces 421b of the abutment blocks 421.

In order to effect a further gear change, the above process is repeated by pedaling backwards to rotate the transmission axle 10 in the reverse direction so that the gear-shift control pawl 48 again drivingly engages with an abutment block 421 on the gear-shift control cam 42. Further reverse rotation of the transmission axle causes the gear-shift control cam 42 to be rotated relative to the transmission axle 10 to retract the second axle pawl 45 disengaging the second transmission gear 32 and to release the third axle pawl 46 to the lift position so that the third transmission gear 33 is engaged. In this way, the user can sequentially move through the various gear selections by simply reversing the direction of the transmission axle 10 and moving sequentially from a first gear to a second gear, from a second gear to a third gear, and from a third gear back to a first gear. During each gear change operation, each of the abutment members 426 are moved from an arcuate slot 415, 435 in one of the fixed axle plates 41, 43, into the next arcuate slot in the other of the fixed axle plates 41, 43.

It will also be appreciated that a user could move through more than one gear change position whilst pedaling backwards without pedaling forwardly between each gear change. For example, a user could reverse the direction of the transmission axle 10 by a sufficient amount to move from a first gear to a third gear before pedaling forwardly or from a second gear to a first gear or from a third gear to a second gear.

The provision of two or more gear-shift control pawls 48 circumferentially displaced about the gear-shift control cam 42 can be used to reduce the angular distance which the user has to pedal backwards before one of the pawls 48 drivingly engages with an abutment block 421 to begin the gear change process.

Movement of the abutment members 426 from an arcuate slot 415, 435 in one of the fixed axle plates 41, 43 to an adjacent arcuate slot 415, 435 in the other of the fixed axle plates during each gear change phase ensures that there is sufficient relative rotation between the transmission axle 10 and the gear-shift control cam 42 to disengage one transmission gear and select the next. In this respect, the fixed axle plates 41, 43 will typically be made of a material having a degree of resilience, such as spring steel, so that the abutment members 426 will tend to be squeezed into the adjacent arcuate slot 415, 435. This causes the transmission axle 10 to be rotated relative to the gear-shift control cam 42 by a small amount to ensure that the transmission is not left in an unstable, idle position between gears. The position of the arcuate slots 415, 435 and the abutment members 426 relative to the concavities 422 in the gear-shift control cam 42 are configured to ensure the movement of the abutment members 426 from one arcuate slot 415, 435 to the next 415, 435 occurs at an appropriate time as the transmission switches over from one gear to the next. Typically, some degree of reverse rotation beyond the point at which the abutment members 426 have moved into a further slot 415, 435 is allowed for each gear change to be fully completed as it may be difficult for a rider to stop reverse pedaling exactly at the point at which the abutment members enter the further slot.

The examples cited above are meant to explain the invention and should not be construed as a limitation on the actual applicable scope of the invention, and as such, all modifications and alterations without departing from the spirits of the invention and appended claims shall remain within the protected scope and claims of the invention.

What is claimed is:

1. A multiple-speed transmission comprising:
a transmission axle drivable by a power input to rotate in both positive and reverse directions;
a gear set comprising a plurality of transmission gears rotatably mounted on the transmission axle and a corresponding plurality of speed-changing gears mounted for rotation about an axis parallel to but spaced from the transmission axle, each of the speed changing gears engaging a respective one of the transmission gears, the speed changing gears being drivingly interconnected so as to rotate synchronously with one another;
a gear-shift mechanism comprising a cam set mounted on the transmission axle and at least one gear-shift control component movably mounted to the transmission axle and operative under control of the cam set to selectively couple one of the transmission gears to the transmission axle so that drive can be transmitted to the coupled transmission gear when the transmission axle is rotated in a forward direction; and
a power output component drivingly coupled with one of the transmission gears;
wherein the cam set comprises first and second fixed axle plates non-rotatably mounted to the transmission axle for synchronous rotation with the transmission axle and a gear-shift control cam rotatably mounted to the transmission axle between the first and second fixed axle plates, the gear-shift control cam having an outer circumferential surface about which are disposed a plurality of abutment blocks;
the gear shift mechanism also comprising at least one gear-shift control pawl biased into contact with the outer circumferential surface of the gear-shift control cam so as to drivingly engage an abutment block on the gear-shift control cam to prevent the gear-shift control cam from rotating in the reverse direction when the transmission axle is rotated in the reverse direction;
the gear-shift control cam and the at least one gear-shift control component being operatively coupled such that the rotational position of the gear-shift control cam relative to the transmission axle determines which of the transmission gears are drivingly coupled to the transmission axle by the at least one gear-shift control component;
wherein the fixed axle plates each have a corresponding plurality of arcuate slots equi-spaced in a circumferential direction on a common pitch circle diameter, the arcuate slots each having a leading end and a trailing end when considered in a forward direction of rotation, the slots in each fixed axle plate being circumferentially offset from the respective slots in the other fixed axle plate and arranged such that there is a circumferential gap between the leading end of each arcuate slot and the trailing end of an adjacent slot in the other plate, the gear-shift control cam having a plurality of abutments equi-spaced circumferentially along the common pitch circle diameter with the arcuate slots, each abutment protruding on both sides of the cam for engagement with the arcuate slots in the fixed axle plates, the abutments being spaced circumferentially by a distance generally equal to the spacing between the leading end of an arcuate slot in one of the fixed axle plates and the leading end of an adjacent arcuate slot in the other of the fixed axle plates such that each abutment can engage with only one of the arcuate slots at any given angular position of the cam relative to the fixed axle plates, the arrangement being such that each abutment is moved out of engagement with one of the arcuate slots in one of the fixed axle plates and into engagement with an adjacent arcuate slot in the other plate as the gear-shift control cam is rotated relative to the transmission axle to effect a change from one gear to another.

2. A multiple-speed transmission according to claim 1, wherein:
the at least one gear-shift control component comprises a plurality of axle pawls, one axle pawl for each transmission gear, the axle pawls being located in recesses spaced circumferentially about the transmission axle and each having a drive tooth for location within an inner annular surface of each axle pawl's respective transmission gear and a shift tooth for location within an inner annular surface of the gear-shift control cam, the drive tooth and the shift tooth of each axle pawl being interconnected for synchronous movement between raised and retracted positions, each axle pawl being biased to a position in which the drive and shift teeth of each respective axle pawl are raised;

the inner annular surface of the gear-shift control cam comprises a plurality of spaced concavities, each of which can accommodate a shift tooth of an axle pawl in the raised position when fully aligned with the shift tooth, the axle pawls and the concavities being arranged so that when the shift tooth of one of the axle pawls is accommodated in a fully raised position in one of the concavities, the shift teeth of the other axle pawls are all held in the respective retracted position;

the inner annular surface of each transmission gear defining at least one abutment surface which can be engaged by the drive tooth of the respective axle pawl of each respective transmission gear when the drive tooth is in a raised position, the drive tooth and abutment surface being configured such that drive can only be transferred from the transmission axle to the transmission gear through the raised drive tooth when the transmission axle is rotated in the positive direction.

3. A multiple-speed transmission according to claim 2, wherein the abutments and arcuate slots are configured so that each abutment enters the gap between adjacent arcuate slots in the two fixed axle plates when the gear-shift control cam is moved to an angular position relative to the transmission axle at which two of the axle pawls are being toggled between raised and retracted positions.

4. A multiple-speed transmission according to claim 2, wherein there are three transmission gears, three speed changing gears and three axle pawls.

5. A multiple-speed transmission according to claim 4, wherein the gear-shift control cam has six abutment blocks on the outer circumferential surface of the gear-shift control cam and two concavities on the inner annular surface of the gear-shift control cam.

6. A multiple-speed transmission according to claim 5, wherein there are three arcuate slots in each of the fixed axle plates and six abutments on the gear-shift control cam for engagement with the arcuate slots.

7. A multiple-speed transmission according to claim 1, wherein all the arcuate slots are of the same length.

8. A multiple-speed transmission according to claim 1, wherein the abutments on the gear-shift control cam comprise steel balls, each steel ball being located in an orifice in the cam plate so as to protrude from the plate on both sides.

9. A multiple-speed transmission according to claim 1, wherein the fixed axle plates are resilient and the abutments are squeezed between the fixed axle plates.

10. A multiple-speed transmission according to claim 1, wherein the transmission axle has drive formations at either end to which cranks can be fitted to drive the transmission axle for positive or reverse rotation.

11. A multiple-speed transmission according to claim 1, in which the transmission is assembled to a bicycle.

* * * * *